(12) United States Patent
Bao et al.

(10) Patent No.: US 12,513,030 B2
(45) Date of Patent: Dec. 30, 2025

(54) DATA TRANSMISSION METHOD AND APPARATUS, ELECTRONIC DEVICE, AND STORAGE MEDIUM

(71) Applicant: ZTE CORPORATION, Shenzhen (CN)

(72) Inventors: Tong Bao, Shenzhen (CN); Yu Xin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 168 days.

(21) Appl. No.: 18/563,109

(22) PCT Filed: May 19, 2022

(86) PCT No.: PCT/CN2022/093767
§ 371 (c)(1),
(2) Date: Nov. 21, 2023

(87) PCT Pub. No.: WO2022/242707
PCT Pub. Date: Nov. 24, 2022

(65) Prior Publication Data
US 2024/0275651 A1    Aug. 15, 2024

(30) Foreign Application Priority Data
May 21, 2021 (CN) .......................... 202110560426.2

(51) Int. Cl.
*H04L 27/26* (2006.01)

(52) U.S. Cl.
CPC .... *H04L 27/26025* (2021.01); *H04L 27/2627* (2013.01)

(58) Field of Classification Search
CPC .......... H04L 27/26025; H04L 27/2602; H04L 27/2603; H04L 27/2601; H04L 27/2604;
(Continued)

(56) References Cited

U.S. PATENT DOCUMENTS

2019/0097859 A1   3/2019   Bala et al.
2019/0327764 A1   10/2019   Yoo et al.
(Continued)

FOREIGN PATENT DOCUMENTS

| CN | 101827059 A | 9/2010 |
|---|---|---|
| CN | 111510412 A | 8/2020 |

(Continued)

OTHER PUBLICATIONS

International Search Report in Application No. PCT/CN2022/093767, dated Aug. 17, 2022, 4 pages, including translation.
(Continued)

*Primary Examiner* — Khanh C Tran
(74) *Attorney, Agent, or Firm* — Morgan, Lewis & Bockius LLP (57) ABSTRACT

Disclosed are a data transmission method and apparatus, an electronic device, and a storage medium. The data transmission method includes the following steps: A sequence S1 is inserted before each first data sequence among L to-be-transmitted first data sequences and a sequence S2 is inserted after each first data sequence so as to form L second data sequences, where L is an integer greater than or equal to 2, the sequence S2 consists of N sequences S3 and one sequence S4 that are connected sequentially, and N is an integer greater than or equal to 1; and the L second data sequences are transmitted.

19 Claims, 4 Drawing Sheets

---

Insert a sequence S1 before each first data sequence among L to-be-transmitted first data sequences and insert a sequence S2 after each first data sequence so as to form L second data sequences    110

↓

Transmit the L second data sequences    120

(58) Field of Classification Search
CPC ............. H04L 27/26035; H04L 27/261; H04L 27/2613; H04L 27/2627; H04L 27/2628; H04L 27/263; H04L 27/2631; H04L 27/2634; H04L 27/2636; H04L 27/2639; H04L 27/2644; H04L 27/2643
See application file for complete search history.

(56) References Cited

U.S. PATENT DOCUMENTS

| | | | |
|---|---|---|---|
| 2020/0266835 A1* | 8/2020 | Yoshida | H03M 13/2921 |
| 2022/0311651 A1* | 9/2022 | Xin | H04L 27/2623 |
| 2022/0385513 A1* | 12/2022 | Xin | H04L 27/2614 |
| 2023/0188295 A1* | 6/2023 | Yuan | H04L 27/2605 |
| | | | 370/329 |

FOREIGN PATENT DOCUMENTS

| | | |
|---|---|---|
| CN | 111901279 A | 11/2020 |
| WO | WO2020/257967 A1 | 12/2020 |

OTHER PUBLICATIONS

Extended European Search Report in Application No. 22804027.5 dated May 12, 2025, 12 pages.
Mitsubishi Electric, "Summary of analysis of UW-DFT-s-OFDM", 3GPP TSG RAN WG1 Meeting #88, R1-1702755, Athens, Greece Feb. 13-17, 2017.

* cited by examiner

DATA TRANSMISSION METHOD AND APPARATUS, ELECTRONIC DEVICE, AND STORAGE MEDIUM

CROSS REFERENCE TO RELATED APPLICATIONS

This is a national stage application filed under 37 U.S.C. 371 based on International Patent Application No. PCT/CN2022/093767, filed May 19, 2022, which claims priority to Chinese Patent Application No. 202110560426.2 filed May 21, 2021, the disclosures of which are incorporated herein by reference in their entireties.

TECHNICAL FIELD

The present application relates to the field of radio communication technology, for example, a data transmission method and apparatus, an electronic device, and a storage medium.

BACKGROUND

The fifth-generation New Radio (5G NR) adopts the orthogonal frequency-division multiplexing (OFDM) technology. Time-frequency resources composed of sub-carriers and OFDM symbols constitute radio physical time-frequency resources of a 5G NR system. The OFDM technology adopts a cyclic prefix (CP) to solve the problem of a multipath delay. Frequency selective channels are divided into a set of parallel flat fading channels, simplifying a channel estimation method. Based on CP-OFDM, the discrete Fourier transform spread (DFTs) OFDM technology may solve the peak-to-average power ratio (PAPR) problem of the CP-OFDM by adding a discrete Fourier transform (DFT) before subcarrier mapping. Although the CP may resist the multipath delay, the CP does not carry any useful data, resulting in a waste of radio physical time-frequency resource overhead. Especially when the frequency band is high, for example, when the frequency band range is greater than 52.6 GHZ, the overhead problem of the CP becomes more serious due to the increase of subcarrier spacing and the shortening of the symbol length. Since the phenomenon of a spectrum leakage of a basic waveform exists in the CP-OFDM, and the 5G NR supports the mixed use of different parameter sets and supports different subcarrier spacings between adjacent sub-bands, interference exists between the adjacent sub-bands. In the related art, in the process of data transmission, a manner like time domain soft CP or filtering is used for reducing the spectrum leakage and interference between sub-bands. However, such a manner still needs to use a protection spacing between sub-bands of different subcarrier spacings, reducing the spectrum efficiency of data transmission.

SUMMARY

A main object of embodiments of the present application is to provide a data transmission method and apparatus, an electronic device, and a storage medium with an aim of reducing the spectrum leakage and interference between sub-bands, reducing a protection spacing between sub-bands of different subcarrier spacings, and improving the spectrum efficiency of data transmission.

Embodiments of the present application provide a data transmission method. The method includes the steps below.

A sequence S1 is inserted before each first data sequence among L to-be-transmitted first data sequences and a sequence S2 is inserted after the each first data sequence so as to form L second data sequences. L is an integer greater than or equal to 2. The sequence S2 consists of N sequences S3 and one sequence S4 that are connected sequentially. N is an integer greater than or equal to 1. The L second data sequences are transmitted.

Embodiments of the present application further provide a data transmission apparatus. The data transmission apparatus includes a sequence processing module and a sequence sending module.

The sequence processing module is configured to insert a sequence S1 before each first data sequence among L to-be-transmitted first data sequences and insert a sequence S2 after the each first data sequence so as to form L second data sequences. L is an integer greater than or equal to 2. The sequence S2 consists of N sequences S3 and one sequence S4 that are connected sequentially. N is an integer greater than or equal to 1. The sequence sending module is configured to transmit the L second data sequences.

Embodiments of the present application further provide an electronic device. The electronic device includes one or more processors and a memory configured to store one or more programs.

When executed by the one or more processors, the one or more programs cause the one or more processors to perform the data transmission method according to any embodiment of the present application.

Embodiments of the present application further provide a computer-readable storage medium for storing a computer program. When the computer program is executed by a processor, the data transmission method according to any embodiment of the present application is performed.

In the embodiment of the present application, a sequence S1 is inserted before each first data sequence among L to-be-transmitted first data sequences and a sequence S2 is inserted after each first data sequence so as to form L second data sequences. The sequence S2 may consist of at least one sequence S3 and one sequence S4. The L second data sequences formed after processing may be sent so that data before and after each to-be-sent second data sequence are equal, improving the continuity of data sequences in a time domain and reducing the spectrum leakage between sub-bands.

DETAILED DESCRIPTION

The embodiments described herein are intended to explain the present application.

Suffixes such as "module", "component" or "unit" used for indicating elements in the subsequent description are used merely for facilitating the description of the present application, and have no particular meaning in themselves. Therefore, "module", "component" or "unit" may be used in a mixed manner.

Figure 1:
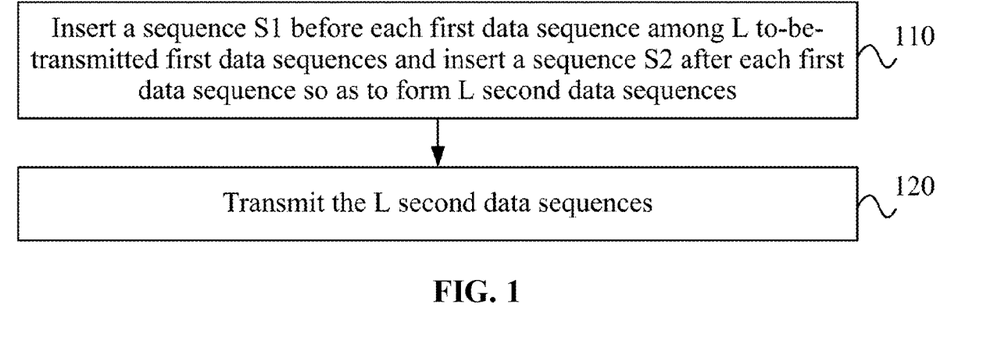
FIG. 1 is a flowchart of a data transmission method according to an embodiment of the present application.

FIG. 1 is a flowchart of a data transmission method according to an embodiment of the present application. The embodiment of the present application may be applicable to the case of data modulation sending. The method may be performed by a data transmission apparatus. The apparatus may be implemented by software and/or hardware. Referring to FIG. 1, the method provided in the embodiment of the present application includes the steps below.

In 110, a sequence S1 is inserted before each first data sequence among L to-be-transmitted first data sequences and a sequence S2 is inserted after each first data sequence so as to form L second data sequences. L is an integer greater than or equal to 2. The sequence S2 consists of N sequences S3 and one sequence S4 that are connected sequentially. N is an integer greater than or equal to 1.

A first data sequence may be a data sequence requiring modulation sending. The first data sequence may include reference signal data. One or more first data sequences may be included.

In the embodiment of the present application, multiple first data sequences may be processed. A sequence S1 and a sequence S2 are inserted before and after each first data sequence respectively. The sequence S2 may include at least one sequence S3 and a sequence S4. The sequence S4 may be located at an end position of the sequence S2.

In 120, the L second data sequences are transmitted.

The second data sequences generated after sequences S1 and sequences S2 are inserted may be sent.

In the embodiment of the present application, a sequence S1 is inserted before each first data sequence among L to-be-transmitted first data sequences and a sequence S2 is inserted after each first data sequence so as to form L second data sequences. The sequence S2 may consist of at least one sequence S3 and one sequence S4. The L second data sequences formed after processing may be sent so that data before and after each to-be-sent second data sequence are equal, improving the continuity of data sequences in a time domain and reducing the spectrum leakage between sub-bands.

On the basis of the preceding embodiment of the present application, a sequence S3 and a sequence S4 have the same length but different content.

In the embodiment of the present application, the sequence S3 and the sequence S4 that are included in the sequence S2 may have the same length. However, the content of the sequence S3 may be different from the content of the sequence S4.

On the basis of the preceding embodiment of the present application, the sequence S1 includes M sequences S3. M is an integer greater than or equal to 1.

The sequence S1 inserted before a first data sequence may also consist of at least one sequence S3.

On the basis of the preceding embodiment of the present application, the L second data sequences have the same length, and at least two second data sequences have different values of N.

In the embodiment of the present application, the sequences S2 inserted into the L second data sequences may include different numbers of sequences S3. For example, a sequence S2 inserted into a second data sequence A may include three sequences S3, and a sequence S2 inserted into another second data sequence B may include two sequences S3.

On the basis of the preceding embodiment of the present application, at least one of the L second data sequences has a value of N greater than or equal to 2.

In the embodiment of the present application, among the sequences S2 inserted into the second data sequences, at least one sequence S2 includes two or more sequences S3.

Figure 2:
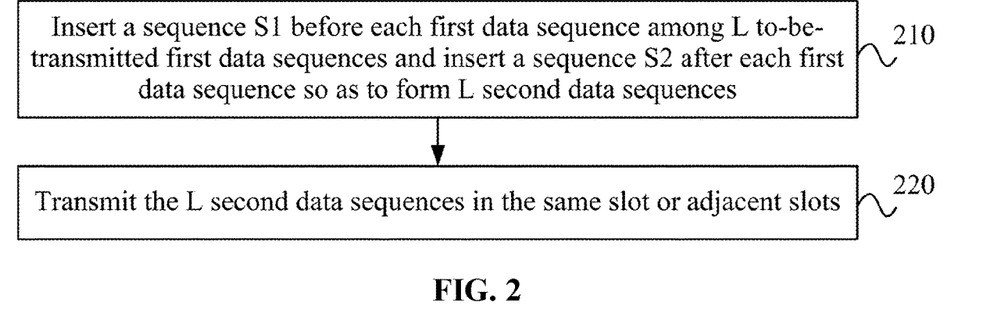
FIG. 2 is a flowchart of another data transmission method according to an embodiment of the present application.

FIG. 2 is a flowchart of another data transmission method according to an embodiment of the present application. This embodiment of the present application is described on the basis of the preceding embodiment of the present application. Referring to FIG. 2, the method provided in this embodiment of the present application includes the steps below.

In 210, a sequence S1 is inserted before each first data sequence among L to-be-transmitted first data sequences and a sequence S2 is inserted after each first data sequence so as to form L second data sequences. L is an integer greater than or equal to 2. The sequence S2 consists of N sequences S3 and one sequence S4 that are connected sequentially. N is an integer greater than or equal to 1.

In 220, the L second data sequences are transmitted in the same slot or adjacent slots.

In the embodiment of the present application, the L generated second data sequences may be transmitted in the same slot or adjacent slots.

On the basis of the preceding embodiment of the present application, the step of transmitting the L second data sequences includes the step below.

The L second data sequences are transmitted in L adjacent data blocks sequentially.

The L generated second data sequences may be transmitted in the L adjacent data blocks separately. Each data block may transmit one second data sequence.

On the basis of the preceding embodiment of the present application, the step of transmitting the L second data sequences includes the step below.

The L second data sequences are transmitted in L data blocks in adjacent slots.

In the embodiment of the present application, the L generated second data sequences may be transmitted in the adjacent slots. The L second data sequences may be sent in the L data blocks in the adjacent slots.

On the basis of the preceding embodiment of the present application, the sequence S1 and the sequence S2 are reference sequences. The reference sequences include a preset sequence and/or a sequence known by a receiving end.

The sequence S1 and the sequence S2 may be reference sequences. The reference sequences may be preset sequences or sequences known by the receiving end. For example, the sequences known by the receiving end may include a sequence set according to a protocol standard or a sequence that has been sent.

On the basis of the preceding embodiment of the present application, a first data sequence includes data modulated by a constellation point and P pieces of reference sequence data. P is an integer greater than or equal to 0.

In the embodiment of the present application, the first data sequence may include the data modulated by the constellation point and at least one piece of reference sequence data.

Figure 3:
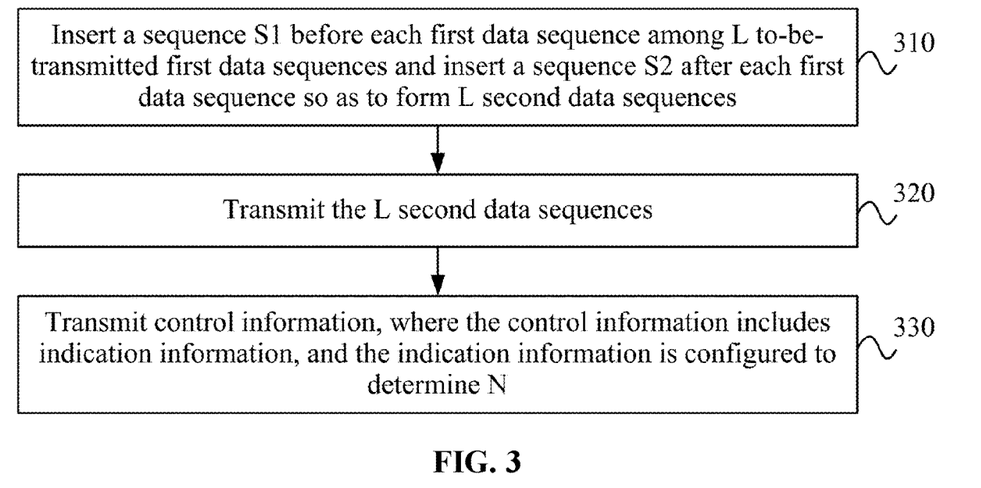
FIG. 3 is a flowchart of another data transmission method according to an embodiment of the present application.

FIG. 3 is a flowchart of another data transmission method according to an embodiment of the present application. This embodiment of the present application is described based on the preceding embodiments of the present application. Referring to FIG. 3, the method provided in this embodiment of the present application includes the steps below.

In 310, a sequence S1 is inserted before each first data sequence among L to-be-transmitted first data sequences and a sequence S2 is inserted after each first data sequence so as to form L second data sequences. L is an integer greater than or equal to 2. The sequence S2 consists of N sequences S3 and one sequence S4 that are connected sequentially. N is an integer greater than or equal to 1.

In 320, the L second data sequences are transmitted.

In 330, control information is transmitted. The control information includes indication information. The indication information is configured to determine N.

The control information may be the information for controlling the demodulation of the second data sequences. The control information may include one or more fields. The information on different fields may represent different information used for demodulation. The indication information may indicate the number of the sequences S3 included in the sequence S2 inserted into each second data sequence. The indication information may be the information of one or more fields in the information format of the control information. The one or more fields may be preset or specified by a protocol.

In the embodiment of the present application, after each second data sequence is sent, the control information for controlling the demodulation of each second data sequence may also be sent. The control information may carry the information for indicating the number of the sequences S3 included in the sequence S2 inserted into each second data sequence.

On the basis of the preceding embodiments of the present application, the indication information is further configured to determine the length of each first data sequence.

The indication information included in the control information may further indicate the length of each first data sequence. One or more pieces of control information may be included. Exemplarily, when multiple pieces of control information are included, each piece of control information may indicate the length of one first data sequence.

On the basis of the preceding embodiments of the present application, the step of transmitting the control information includes transmitting the control information through an uplink control channel or a downlink control channel.

The control information may be transmitted in the uplink control channel or the downlink control channel.

On the basis of the preceding embodiments of the present application, the step of transmitting the control information includes the step below.

The control information is transmitted through uplink radio resource control (RRC) signaling or downlink RRC signaling.

In the embodiment of the present application, the control information may be transmitted in the downlink radio resource control signaling or the uplink radio resource control signaling.

On the basis of the preceding embodiments of the present application, the method further includes performing Fourier transform processing on the L second data sequences.

Fourier transform may be performed on each second data sequence. Each second data sequence may be transformed from a time domain signal to a frequency domain signal.

On the basis of the preceding embodiments of the present application, the length of a second data sequence is the window length of the Fourier transform processing.

In the embodiment of the present application, when the Fourier transform processing is performed on the second data sequences, the window length of a Fourier transform process may be set as the length of each second data sequence.

On the basis of the preceding embodiments of the present application, start and end positions of a second data sequence are start and end positions of the Fourier transform processing.

When the Fourier transform processing is performed on the second data sequences, the start and end positions of the Fourier transform processing may be set as start and end positions of each second data sequence.

On the basis of the preceding embodiments of the present application, a start position of the Fourier transform processing is a position of the sequence S1, and an end position of the Fourier transform processing is a position of the sequence S2.

In the embodiment of the present application, when the Fourier transform processing is performed on each second data sequence, the position of the sequence S1 inserted before each second data sequence is the start position of the Fourier transform processing, and the position of the sequence S2 inserted after each second data sequence is the end position of the Fourier transform processing.

Figure 4:
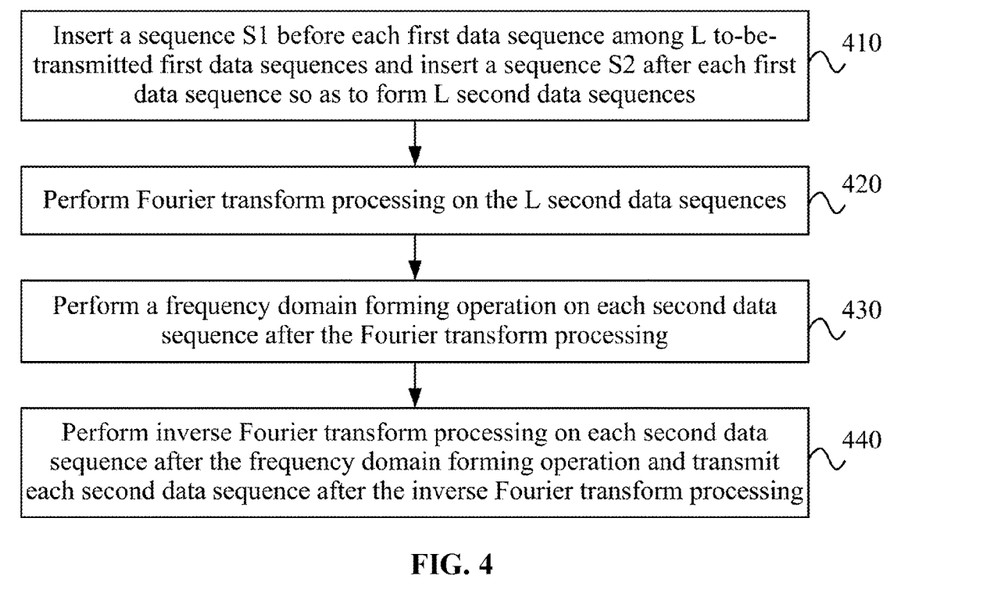
FIG. 4 is a flowchart of another data transmission method according to an embodiment of the present application.

FIG. 4 is a flowchart of another data transmission method according to an embodiment of the present application. This embodiment of the present application is described based on the preceding embodiment of the present application. Referring to FIG. 4, the method provided in this embodiment of the present application includes the steps below.

In 410, a sequence S1 is inserted before each first data sequence among L to-be-transmitted first data sequences and a sequence S2 is inserted after each first data sequence so as to form L second data sequences. L is an integer greater than or equal to 2. The sequence S2 consists of N sequences S3 and one sequence S4 that are connected sequentially. N is an integer greater than or equal to 1.

In 420, Fourier transform processing is performed on the L second data sequences.

Through the Fourier transform processing, data may be transformed from a time domain signal to a frequency domain signal.

The L second data sequences may be transformed from time domain signals to frequency domain signals.

In 430, a frequency domain forming operation is performed on each second data sequence of the L second data sequences after the Fourier transform processing.

Frequency domain forming may be the processing of a dot product between the discrete frequency domain data generated by the Fourier transform and a spectrum forming sequence to reduce a peak-to-average power ratio. The spectrum forming sequence may be a pre-determined sequence.

In the embodiment of the present application, the frequency domain forming operation may be performed on each second data sequence transformed to a frequency domain signal. The frequency domain signal corresponding to each second data sequence may be multiplied by the preset spectrum forming sequence, reducing the peak-to-average power ratio of each second data sequence.

In 440, inverse Fourier transform processing is performed on each second data sequence after the frequency domain forming operation, and each second data sequence after the inverse Fourier transform processing is transmitted.

Inverse Fourier transform may be the processing of transforming a frequency domain signal to a time domain signal. The number of points sampled through the inverse Fourier transform in a period may be the same as or different from the number of points sampled through the Fourier transform in the preceding step. For example, when the number of points sampled through the Fourier transform in the period is less than the number of points sampled through the inverse Fourier transform in the period, the processing on each second data sequence may be the processing of oversampling.

In the embodiment of the present application, each second data sequence after the frequency domain forming operation may be transformed from a frequency domain signal to a time domain signal, and each second data sequence having been transformed to a time domain signal is transmitted.

In the embodiment of the present application, the step of transmitting the L second data sequences includes performing filtering and a digital-to-analog conversion on the L second data sequences sequentially and transmitting a signal generated after the digital-to-analog conversion.

The filtering and the digital-to-analog conversion may be performed on each second data sequence. A signal generated after the digital-to-analog conversion may be sent to implement the transmission of each second data sequence.

On the basis of the preceding embodiments of the present application, the sequence S1 and/or the sequence S2 is a data sequence modulated by π/2 binary phase shift keying.

In the embodiment of the present application, the sequence S1 and the sequence S2 may be a data sequence modulated by π/2 binary phase shift keying (BPSK).

On the basis of the preceding embodiments of the present application, the sequence S1 and/or the sequence S2 is a ZC sequence.

The ZC sequence may be a Zadoff-Chu sequence with good autocorrelation and cross-correlation, which may reduce the mutual interference between different preambles.

Figure 5:
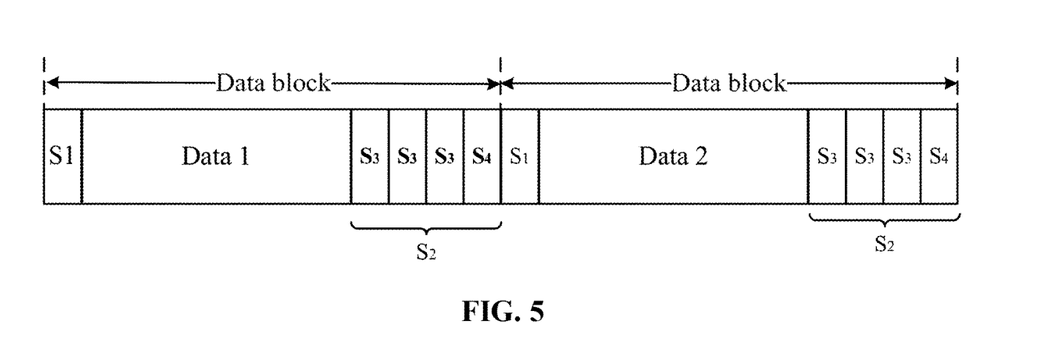
FIG. 5 is an exemplary diagram of a data sequence according to an embodiment of the present application.

In an exemplary embodiment, L to-be-transmitted first data sequences may be processed to form L second data sequences, and the L second data sequences are sent. FIG. 5 is an exemplary diagram of a data sequence according to an embodiment of the present application. Referring to FIG. 5, the L to-be-transmitted first data sequences include data 1 and data 2. In the embodiment of the present application, L is 2. L in other embodiments may be an integer greater than 2. A sequence S1 and a sequence S2 may be inserted before and after the data 1 respectively to form the first second data sequence. The sequence S2 may be generated by connecting three sequences S3 and one sequence S4 sequentially. A sequence S1 and a sequence S2 may be inserted before and after the data 2 respectively to form the second second data sequence. The sequence S2 may include three sequences S3 and one sequence S4. The three sequences S3 and the one sequence S4 are connected sequentially to form the sequence S2. In the embodiment of the present application, a sequence S3 and a sequence S4 may be different sequences. Among the two formed second data sequences, the length of each second data sequence is the length of one data block. The two generated second data sequences are transmitted sequentially.

Figure 6:
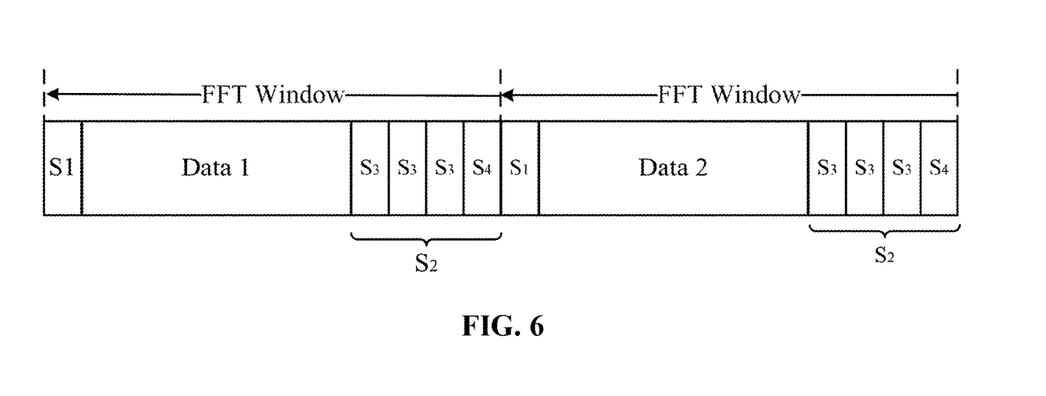
FIG. 6 is an exemplary diagram of another data sequence according to an embodiment of the present application.

In an exemplary embodiment, L to-be-transmitted first data sequences may be processed to form L second data sequences, and the L second data sequences are sent. FIG. 6 is an exemplary diagram of another data sequence according to an embodiment of the present application. Referring to FIG. 6, the L to-be-transmitted first data sequences include data 1 and data 2. L is 2. L in other embodiments may be an integer greater than 2. A sequence S1 and a sequence S2 may be inserted before and after the data 1 respectively to form the first second data sequence. The sequence S2 may be generated by connecting three sequences S3 and one sequence S4 sequentially. A sequence S1 and a sequence S2 may be inserted before and after the data 2 respectively to form the second second data sequence. The sequence S2 may include three sequences S3 and one sequence S4. The three sequences S3 and the one sequence S4 are connected sequentially to form the sequence S2. In the embodiment of the present application, a sequence S3 and a sequence S4 may be different sequences. Among the L formed second data sequences, the length of each second data sequence may be the window length of fast Fourier transform (FFT) processing. In the embodiment of the present application, the window length of the FFT processing of the first second data sequence is the same as the window length of the FFT processing of the second second data sequence. Start and end positions of each second data sequence may be start and end positions of the FFT processing. An end position of the FFT processing of the first second data sequence may be a start position of the FFT processing of the second second data sequence. The two generated second data sequences may be transmitted sequentially.

Figure 7:
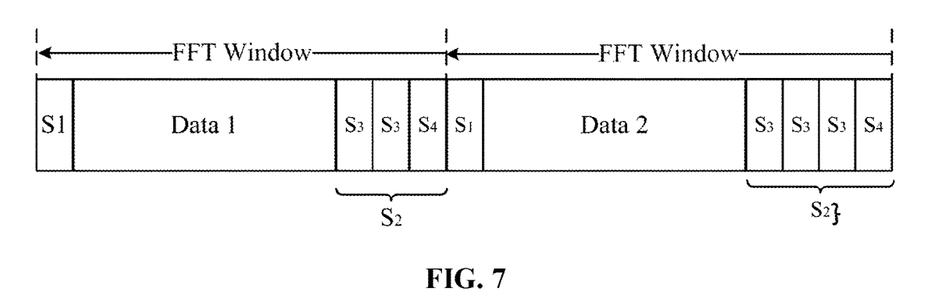
FIG. 7 is an exemplary diagram of another data sequence according to an embodiment of the present application.

In an exemplary embodiment, L to-be-transmitted first data sequences may be processed to form L second data sequences, and the L second data sequences are sent. FIG. 7 is an exemplary diagram of another data sequence according to an embodiment of the present application. Referring to FIG. 7, the L to-be-transmitted first data sequences include data 1 and data 2. L is 2. L in other embodiments may be an integer greater than 2. That is, the L to-be-transmitted first data sequences may include at least two first data sequences. A sequence S1 and a sequence S2 may be inserted before and after the data 1 respectively to form the first second data sequence. The sequence S2 may include two sequences S3 and one sequence S4. In this case, N in the sequence S2 is 2. A sequence S1 and a sequence S2' may be inserted before and after the data 2 respectively to form the second second data sequence. The sequence S2' may include three sequences S3 and one sequence S4. In this case, N in the sequence S2' is 3. In the embodiment of the present application, N may be modulated flexibly according to the magnitude of a radio-channel multipath delay. Referring to FIG. 7, N in the first second data sequence is 2, and N in the second second data sequence is 3. A radio-channel multipath delay corresponding to the first second data sequence is less than a radio-channel multipath delay corresponding to the second second data sequence.

In the embodiment of the present application, the length of each second data sequence may be the window length of FFT processing. The sequence length of the data 1 is greater than the sequence length of the data 2. The window length of the FFT processing of the first second data sequence is the same as the window length of the FFT processing of the second second data sequence. An end position of the FFT processing of the first second data sequence is a start position of the FFT processing of the second second data sequence.

Figure 8:
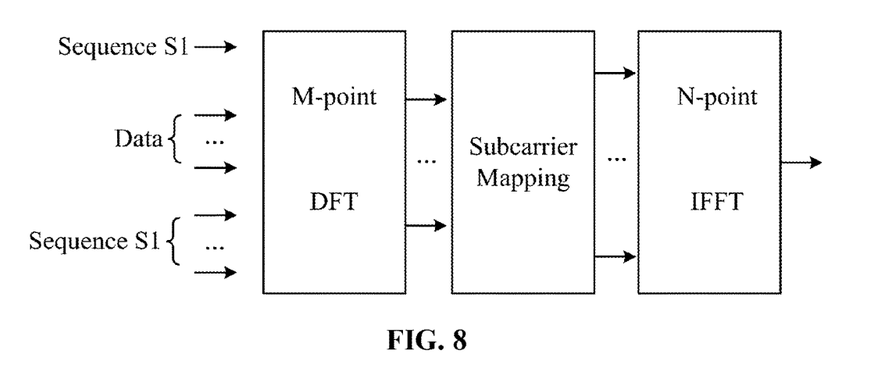
FIG. 8 is an exemplary diagram of another data transmission method according to an embodiment of the present application.

In an exemplary embodiment, FIG. 8 is an exemplary diagram of another data transmission method according to an embodiment of the present application. Referring to FIG. 8. L second data sequences may be formed based on the preceding embodiments. For example, a sequence S1 and a sequence S2 may be inserted before and after each first data sequence among L first data sequences respectively to form the L second data sequences. The leftmost side in FIG. 8 shows serial second data sequences in a time domain. Then discrete Fourier transform (DFT) processing is performed on each second data sequence at M points so as to transform each second data sequence into a parallel frequency domain. M is the length of a corresponding second data sequence, that is, the number of pieces of data. Then subcarrier mapping is performed on the second data sequences in a frequency domain form. Data 0 is placed in a position of at least one subcarrier to implement oversampling. Then inverse fast Fourier transformation (IFFT) processing at N points is performed to transform the second data sequences in the frequency domain form into serial time domain data in a time domain, thereby sequentially forming L pieces of time domain data after the IFFT processing. In the embodiment of the present application, oversampling exists. Therefore, N is greater than M; that is, the number of IFFT operation points is greater than the number of DFT operation points.

Figure 9:
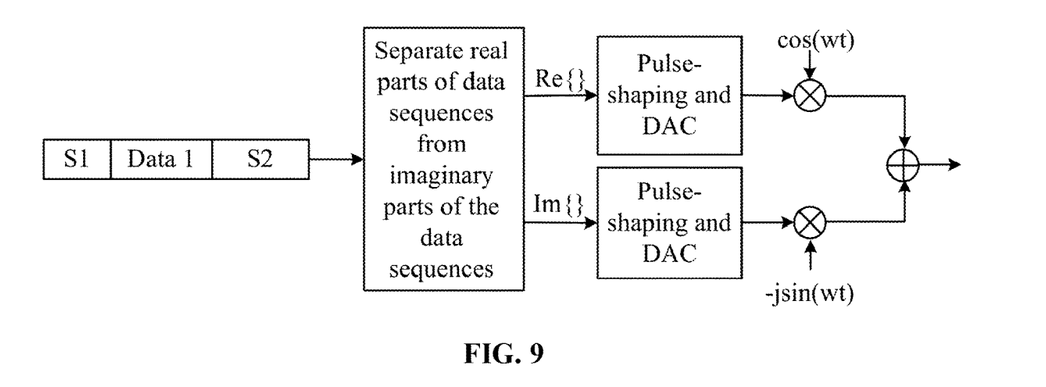
FIG. 9 is an exemplary diagram of another data transmission method according to an embodiment of the present application.

In an exemplary embodiment. FIG. 9 is an exemplary diagram of another data transmission method according to an embodiment of the present application. Referring to FIG. 9, a sequence S1 and a sequence S2 are inserted before and after each first data sequence among L to-be-transmitted first data sequences sequentially to form L second data sequences. Real parts of the L second data sequences and imaginary parts of the L second data sequences may be separated to form real-part data sequences and imaginary-part data sequences respectively. Filtering and a digital-to-analog conversion are performed on the real-part data sequences and the imaginary-part data sequences separately. The filtering may be performed before the real parts of the second data sequences are separated from the imaginary parts of the second data sequences. The filtering and the digital-to-analog conversion may be implemented simultaneously in one module. A signal formed after the digital-to-analog conversion may be transmitted. The signal may also be modulated to a carrier frequency by a mixer for transmission.

Figure 10:
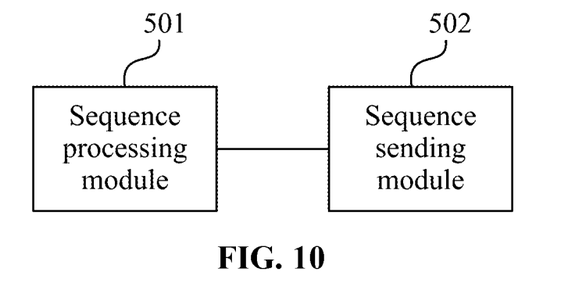
FIG. 10 is a structural diagram of a data transmission apparatus according to an embodiment of the present application.

FIG. 10 is a structural diagram of a data transmission apparatus according to an embodiment of the present application. The apparatus may perform the data transmission method according to any embodiment of the present application, has corresponding function modules and effects of the performed method, and may be implemented through software and/or hardware. The apparatus includes a sequence processing module 501 and a sequence sending module 502.

The sequence processing module 501 is configured to insert a sequence S1 before each first data sequence among L to-be-transmitted first data sequences and insert a sequence S2 after each first data sequence so as to form L second data sequences. L is an integer greater than or equal to 2. The sequence S2 consists of N sequences S3 and one sequence S4 that are connected sequentially. N is an integer greater than or equal to 1.

The sequence sending module 502 is configured to transmit the L second data sequences.

In the embodiment of the present application, the sequence processing module 501 inserts a sequence S1 before each first data sequence among L to-be-transmitted first data sequences and inserts a sequence S2 after each first data sequence so as to form L second data sequences. The sequence S2 may consist of at least one sequence S3 and one sequence S4. The sequence sending module 502 transmits the L second data sequences formed after processing so that data before and after each to-be-sent second data sequence are equal, improving the continuity of data sequences in a time domain and reducing the spectrum leakage between sub-bands.

On the basis of the preceding embodiments of the present application, a sequence S3 in the apparatus and a sequence S4 in the apparatus have the same length but different content.

On the basis of the preceding embodiments of the present application, the sequence S1 in the apparatus includes M sequences S3. M is an integer greater than or equal to 1.

On the basis of the preceding embodiments of the present application, the L second data sequences in the apparatus have the same length, and at least two second data sequences have different values of N.

On the basis of the preceding embodiments of the present application, at least one of the L second data sequences in the apparatus has a value of N greater than or equal to 2.

On the basis of the preceding embodiments of the present application, the sequence sending module 502 in the apparatus includes a slot sending unit.

The slot sending unit is configured to transmit the L second data sequences in the same slot or adjacent slots.

On the basis of the preceding embodiments of the present application, the sequence sending module 502 in the apparatus further includes a data block sending unit.

The data block sending unit is configured to transmit the L second data sequences in L adjacent data blocks sequentially.

On the basis of the preceding embodiments of the present application, the sequence sending module 502 in the apparatus further includes a sequence sending unit.

The sequence sending unit is configured to transmit the L second data sequences in L data blocks in adjacent slots.

On the basis of the preceding embodiments of the present application, the sequence S1 in the apparatus and the sequence S2 in the apparatus are reference sequences. The reference sequences include a preset sequence and/or a sequence known by a receiving end.

On the basis of the preceding embodiments of the present application, a first data sequence of the L first data sequences in the apparatus includes the data modulated by a constellation point and P pieces of reference sequence data. P is an integer greater than or equal to 0.

On the basis of the preceding embodiments of the present application, the apparatus further includes a control sending module.

The control sending module is configured to transmit control information. The control information includes indication information. The indication information is configured to determine N.

On the basis of the preceding embodiments of the present application, the indication information in the apparatus is also configured to determine the length of each first data sequence.

On the basis of the preceding embodiments of the present application, the control sending module in the apparatus includes a first sending unit.

The first sending unit is configured to transmit the control information through an uplink control channel or a downlink control channel.

On the basis of the preceding embodiments of the present application, the control sending module in the apparatus further includes a second sending unit.

The second sending unit is configured to transmit the control information through uplink radio resource control (RRC) signaling or downlink RRC signaling.

On the basis of the preceding embodiments of the present application, the apparatus further includes a transform processing module.

The transform processing module is configured to perform Fourier transform processing on the L second data sequences.

On the basis of the preceding embodiments of the present application, a length of a second data sequence in the apparatus is the window length of the Fourier transform processing.

On the basis of the preceding embodiments of the present application, start and end positions of a second data sequence in the apparatus are start and end positions of the Fourier transform processing.

On the basis of the preceding embodiments of the present application, a start position of the Fourier transform processing in the apparatus is a position of the sequence S1, and an end position of the Fourier transform processing in the apparatus is a position of the sequence S2.

On the basis of the preceding embodiments of the present application, the sequence sending module 502 in the apparatus further includes a Fourier transform unit, a frequency domain forming unit, and an inverse Fourier transform processing unit.

The Fourier transform unit is configured to perform the Fourier transform processing on the L second data sequences.

The frequency domain forming unit is configured to perform a frequency domain forming operation on each second data sequence after the Fourier transform processing.

The inverse Fourier transform processing unit is configured to perform inverse Fourier transform processing on each second data sequence after the frequency domain forming operation and transmit each second data sequence after the inverse Fourier transform processing.

On the basis of the preceding embodiments of the present application, the sequence sending module 502 in the apparatus further includes a signal sending unit.

The signal sending unit is configured to perform filtering and a digital-to-analog conversion on the L second data sequences sequentially and transmit a signal generated after the digital-to-analog conversion.

On the basis of the preceding embodiments of the present application, the sequence S1 in the apparatus and/or the sequence S2 in the apparatus is a data sequence modulated by $\pi/2$ binary phase shift keying.

On the basis of the preceding embodiments of the present application, the sequence S1 in the apparatus and/or the sequence S2 in the apparatus is a ZC sequence.

Figure 11:
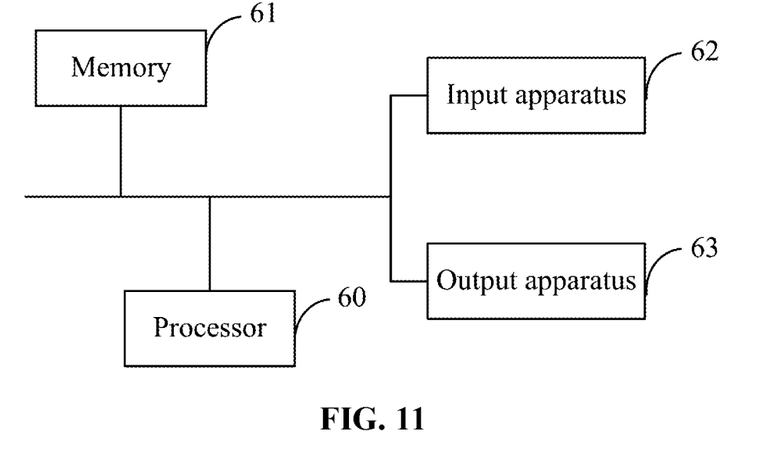
FIG. 11 is a structural diagram of an electronic device according to an embodiment of the present application.

FIG. 11 is a structural diagram of an electronic device according to an embodiment of the present application. The device electronic includes a processor 60, a memory 61, an input apparatus 62, and an output apparatus 63. One or more processors 60 may be included in the electronic device. One processor 60 is shown as an example in FIG. 11. The processor 60, the memory 61, the input apparatus 62, and the output apparatus 63 in the electronic device may be connected via a bus or in other manners. The connection via a bus is shown as an example in FIG. 11.

As a computer-readable storage medium, the memory 61 may be configured to store software programs, computer executable programs, and modules, for example, modules (a sequence processing module 501 and a sequence sending module 502) corresponding to the data transmission apparatus in embodiments of the present application. The processor 60 executes the software programs, instructions, and modules stored in the memory 61 to perform function applications and data processing of the electronic device, that is, to implement the preceding data transmission method.

The memory 61 may mainly include a program storage region and a data storage region. The program storage region may store an operating system and an application program required by at least one function. The data storage region may store data created based on the use of the electronic device. Additionally, the memory 61 may include a high-speed random-access memory and may also include a non-volatile memory, such as at least one magnetic disk memory, a flash memory, or another nonvolatile solid-state memory. In some examples, the memory 61 may include memories which are remotely disposed relative to the processor 60 and these remote memories may be connected to the electronic device via a network. Examples of the preceding network include, but are not limited to, the Internet, an intranet, a local area network, a mobile communication network, and a combination thereof.

The input apparatus 62 may be configured to receive inputted digital or character information and generate key signal input related to user settings and function control of the electronic device. The output apparatus 63 may include a display device such as a display screen.

An embodiment of the present application further provides a storage medium including computer-executable instructions which, when executed by a computer processor, are configured to perform a data transmission method. The method includes the steps below.

A sequence S1 is inserted before each first data sequence among L to-be-transmitted first data sequences and a sequence S2 is inserted after each first data sequence so as to form L second data sequences. L is an integer greater than or equal to 2. The sequence S2 consists of N sequences S3 and one sequence S4 that are connected sequentially. N is an integer greater than or equal to 1. The L second data sequences are transmitted.

From the preceding description of the embodiments, the present application may be implemented by means of both software and required general-purpose hardware, and also by means of hardware. Technical solutions of the present application may be essentially embodied in the form of a software product. The software product in a computer may be stored in a computer-readable storage medium such as a floppy disk, a read-only memory (ROM), a random-access memory (RAM), a flash memory, a hard disk or an optical disc in the computer and includes several instructions for enabling a computer device (which may be a personal computer, a server or a network device) to perform the method of the embodiments of the present application.

Units and modules included in the embodiment of the preceding apparatus are just divided according to functional logic, but the present application is not limited to this division as long as the corresponding functions can be implemented. Additionally, the names of function units are just used to distinguish between each other and are not intended to limit the scope of the present application.

Function modules/units in all or part of the steps of the method, the system and the device disclosed in the preceding description may be implemented as software, firmware, hardware or any appropriate combination thereof.

In the hardware implementation, the division of the preceding function modules/units may not correspond to the division of physical components. For example, one physical component may have multiple functions, or one function or step may be performed jointly by several physical components. Some or all physical components are implementable as software executed by a processor such as a central processing unit, a digital signal processor, or a microprocessor, are implementable as hardware, or are implementable as integrated circuits such as application-specific integrated circuits. Such software may be distributed on computer-readable media. The computer-readable media may include computer storage media (or non-transitory media) and communication media (or transitory media). As known to those of ordinary skill in the art, the term computer storage media includes volatile and non-volatile as well as removable and non-removable media implemented in any method or technology for storing information (such as computer-readable instructions, data structures, program modules, or other data). The computer storage media include, but are not limited to, a RAM, a ROM, an electrically erasable programmable read-only memory (EEPROM), a flash memory, or other memory technologies, a compact disc read-only memory (CD-ROM), a digital versatile disc (DVD) or other optical disc memories, magnetic cassettes, magnetic tapes, magnetic disk memories or other magnetic storage apparatuses, or any other medium used for storing the desired information and accessible by a computer. Moreover, as known to those of ordinary skill in the art, the communication media generally include computer-readable instructions, data structures, program modules, or other data in carriers or in modulated data signals transported in other transport mechanisms and may include any information delivery medium.

What is claimed is:

1. A data transmission method, comprising:
   inserting a sequence S1 before each first data sequence among L to-be-transmitted first data sequences and inserting a sequence S2 after the each first data sequence so as to form L second data sequences, wherein L is an integer greater than or equal to 2, the sequence S2 consists of N sequences S3 and one sequence S4 that are connected sequentially, and N is an integer greater than or equal to 1; and
   transmitting the L second data sequences;
   wherein a sequence S3 of the N sequences S3 and the sequence S4 have a same length but different content.

2. The method according to claim 1, wherein the sequence S1 comprises M sequences S3, wherein M is an integer greater than or equal to 1.

3. The method according to claim 1, wherein the L second data sequences have a same length, and at least two of the L second data sequences have different values of N.

4. The method according to claim 1, wherein at least one of the L second data sequences has a value of N greater than or equal to 2.

5. The method according to claim 1, wherein transmitting the L second data sequences comprises:
   transmitting the L second data sequences in a same slot or adjacent slots.

6. The method according to claim 1, wherein transmitting the L second data sequences comprises:
   transmitting the L second data sequences in L adjacent data blocks sequentially.

7. The method according to claim 1, wherein transmitting the L second data sequences comprises:
   transmitting the L second data sequences in L data blocks in adjacent slots.

8. The method according to claim 1, wherein the sequence S1 and the sequence S2 are reference sequences, wherein the reference sequences comprise at least one of a preset sequence and a sequence known by a receiving end.

9. The method according to claim 1, wherein a first data sequence of the L first data sequences comprises data modulated by a constellation point and P pieces of reference sequence data, wherein P is an integer greater than or equal to 0.

10. The method according to claim 1, further comprising:
    transmitting control information, wherein the control information comprises indication information, and the indication information is configured to determine N.

11. The method according to claim 10, wherein the indication information is further configured to determine a length of the each first data sequence.

12. The method according to claim 10, wherein transmitting the control information comprises:
    transmitting the control information through an uplink control channel or a downlink control channel; or
    transmitting the control information through uplink radio resource control (RRC) signaling or downlink RRC signaling.

13. The method according to claim 1, further comprising:
    performing Fourier transform processing on the L second data sequences;
    wherein a length of a second data sequence of the L second data sequences is a window length of the Fourier transform processing; and
    wherein start and end positions of the second data sequence are start and end positions of the Fourier transform processing.

14. The method according to claim 13, wherein a start position of the Fourier transform processing is a position of the sequence S1, and an end position of the Fourier transform processing is a position of the sequence S2.

15. The method according to claim 1, wherein transmitting the L second data sequences comprises:
    performing Fourier transform processing on the L second data sequences;
    performing a frequency domain forming operation on each second data sequence of the L second data sequences after the Fourier transform processing; and
    performing inverse Fourier transform processing on the each second data sequence after the frequency domain forming operation, and transmitting the each second data sequence after the inverse Fourier transform processing.

16. The method according to claim 1, wherein transmitting the L second data sequences comprises:
    performing filtering and a digital-to-analog conversion on the L second data sequences sequentially, and transmitting a signal generated after the digital-to-analog conversion.

17. The method according to claim 1, wherein
    at least one of the sequence S1 or the sequence S2 is a data sequence modulated by $\pi/2$ binary phase shift keying; or the at least one of the sequence S1 or the sequence S2 is a Zadoff-Chu (ZC) sequence.

18. An electronic device, comprising:

at least one processor; and a memory configured to store at least one program;

wherein when executed by the at least one processor, the at least one program causes the at least one processor to perform:

inserting a sequence S1 before each first data sequence among L to-be-transmitted first data sequences and inserting a sequence S2 after the each first data sequence so as to form L second data sequences, wherein L is an integer greater than or equal to 2, the sequence S2 consists of N sequences S3 and one sequence S4 that are connected sequentially, and N is an integer greater than or equal to 1; and transmitting the L second data sequences;

wherein a sequence S3 of the N sequences S3 and the sequence S4 have a same length but different content.

19. A non-transitory computer-readable storage medium for storing a computer program, wherein the computer program, when executed by a processor, cause the processor to implement:

inserting a sequence S1 before each first data sequence among L to-be-transmitted first data sequences and inserting a sequence S2 after the each first data sequence so as to form L second data sequences, wherein L is an integer greater than or equal to 2, the sequence S2 consists of N sequences S3 and one sequence S4 that are connected sequentially, and N is an integer greater than or equal to 1; and transmitting the L second data sequences;

wherein a sequence S3 of the N sequences S3 and the sequence S4 have a same length but different content.

* * * * *